United States Patent
Bergman

(10) Patent No.: US 6,389,632 B1
(45) Date of Patent: May 21, 2002

(54) COMPUTER MOUSE CLEANER

(76) Inventor: Thomas P. Bergman, 635 Timber La., Edmond, OK (US) 73034

(*) Notice: Subject to any disclaimer, the term of this patent is extended or adjusted under 35 U.S.C. 154(b) by 0 days.

(21) Appl. No.: 09/377,532

(22) Filed: Aug. 19, 1999

(51) Int. Cl.[7] ................................................. B08B 9/00
(52) U.S. Cl. ................... 15/105; 15/236.07; 15/236.01; 15/104.001; 81/176.1; 81/488; 7/151; 7/170
(58) Field of Search ..................... 15/105, 111, 236.06, 15/236.07, 236.09, 236.05, 105.52, 104.001, 236.01; 81/488, 176.1; 7/151, 170, 138

(56) References Cited

U.S. PATENT DOCUMENTS

| | | | |
|---|---|---|---|
| 717,998 A | * | 1/1903 | Huebner |
| 1,434,744 A | * | 11/1922 | Hibbler |
| D105,369 S | * | 7/1937 | Babcock |
| 2,723,581 A | * | 11/1955 | Schwaiger |
| 4,214,342 A | * | 7/1980 | Amundsen ............... 15/236.05 |
| 4,580,469 A | | 4/1986 | Lordahl ...................... 81/437 |
| 5,497,523 A | | 3/1996 | Tarnoff ........................ 7/138 |
| 6,185,778 B1 | * | 2/2001 | Ornstedt ............... 15/104.001 |

* cited by examiner

Primary Examiner—Gary K. Graham

(57) ABSTRACT

As an article of manufacture a computer mouse cleaning tool is formed by an elongated rod-like body having one converging end portion terminating in a transverse concave radius of a selected dimension. The other end portion of the rod is flattened and bifurcated to form spanner wrench flats for removing the ball retainer and the ball of a computer mouse and cleaning debris off mouse housing components with the radius end portion of the tool.

4 Claims, 1 Drawing Sheet

COMPUTER MOUSE CLEANER

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to a computer mouse and more particularly to a tool for manually cleaning components in a computer mouse housing which moves the mouse pointer on a computer screen.

1. Field of the Invention

As a computer mouse is repeatedly moved across the surface of a mouse pad or a desk top on which the surfaces contain or are soiled by contact with the user's hand and/or arm, the mouse pointer moving ball deposits particles of oil, dust, dirt, or the like, on internal mouse housing components. Over time this debris accumulates on the mouse pointer moving components driven by the mouse ball and on the perimeter of the idler wheel maintaining the mouse ball in contact with the driven parts. When a build-up of such debris becomes sufficiently thick the mouse begins to malfunction and the surfaces controlling the mouse pointer must be cleaned to restore the mouse to its operative condition. This invention provides a tool for manually cleaning the mouse components.

2. Description of the Prior Art

I do not know of any publication disclosing the tool of this invention.

This tool includes a well known spanner wrench end portion such as is disclosed by the following patents, generally illustrating the state-of-the-art: U.S. Pat. No. 4,580,469 issued Apr. 8, 1986 to Lordahl for Tool and Spanner Wrench and U.S. Pat. No. 5,497,523 issued Mar. 12, 1996 to Tarnoff for Automatic Golf Spike Replacer.

BRIEF SUMMARY OF THE INVENTION

The tool is elongated rod-like in general configuration having one converging end portion terminating in a transverse relatively narrow rectangular configuration and having a concave radius of a selected dimension. The other end portion of the rod is flattened and bifurcated to form spanner wrench flats engaging radial serrations on a mouse ball retainer ring of computer mouse housings for removing the ball retainer and the ball for accessing cylindrical ball driven rollers which move the mouse pointer vertically and horizontally, respectively. An idler wheel in the mouse housing maintains the mouse ball in firm contact with the two driven rollers during use. With the mouse ball removed, the concave tip is used to scrape built-up debris off the rollers and idler wheel. Replacing the mouse ball and securing it with the retainer ring, returns the mouse to working order.

The principal objects of this invention are to provide a tool for manually removing the ball retainer ring from the underside of a computer mouse housing and clean any accumulated debris from parts within the mouse housing to insure maintaining proper function of the mouse in moving its pointer, and which may be economically manufactured and has a long useful life.

DETAILED DESCRIPTION OF THE INVENTION

Figure 3:
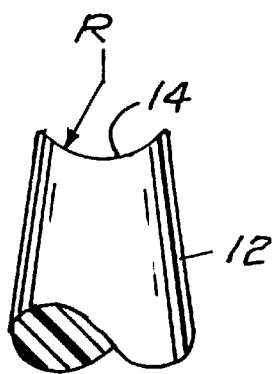
FIG. 3 is an enlarged view of the area enclosed by the arrows 3.

Like characters of reference designate like parts in those figures of the drawings in which they occur.

In the drawings:

The reference numeral 10 indicates the device comprising an elongated rod-like body 11 in general configuration. A cylinder rod 3.75 cm (3/8 in.) diameter and 12.7 cm (5 in. long) has proven satisfactory.

One end portion 12 of the body converges forming a rectangular end surface 14 having a concave radius R of selected dimension, e.g. one half the rod diameter. The transverse width of the end radius surface 14 is preferably relatively narrow 0.0794 mm (1/32 in.).

The interface of the respective end of the radius with the side surface of the body converging end portion similarly defines a relatively small radius (0.0794 mm 1/32 in.) for the purpose presently explained.

The opposite end portion of the body is transversely flattened to define lateral rearwardly diverging edge surfaces 16 and 17. The thickness of the flattened portion between the side edges 16 and 17 is preferably 1/3 the diameter of the rod.

The flattened end portion opposite the radius 14 is bifurcated to define laterally spaced spanner wrench flats 18 for the purpose of engaging serrations or indentations on a mouse ball (not shown) retainer ring (not shown) for removing the retainer and the mouse ball from the mouse housing to expose two spaced-apart cylindrical driven rollers (not shown) which move the mouse pointer vertically and horizontally, respectively. The mouse housing contains an idler wheel (not shown) having a transverse flat peripheral surface which maintains pressure on the mouse ball to hold the latter firmly against a peripheral portion of the surfaces of the two cylindrical driven rollers during use. The body flat end portion opposite the radius 14, prevents angular rotation of the tool 10 when placed on an inclined surface.

The radius of the end surface 14 is complemental with the periphery of the cylindrical driven rollers and may be used to manually scrape off any debris clinging to the surfaces of the latter. Similarly, the small radial edges at the respective ends of the radius 14 are used to remove material from the periphery of the idler wheel. After cleaning the mouse housing components, the ball is inserted into the mouse housing and the retainer ring reinstalled and tightened by the use of the spanner wrench flats 18.

Figure 4:
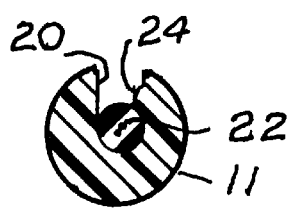
FIG. 4 is a transverse cross sectional view taken substantially along the line 4—4 of FIG. 1.
Figure 2:
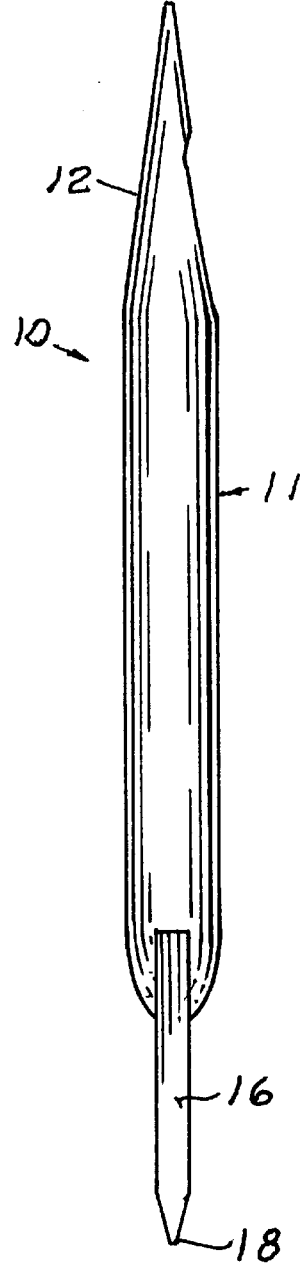
FIG. 2 is a side elevational view of FIG. 1.
Figure 1:
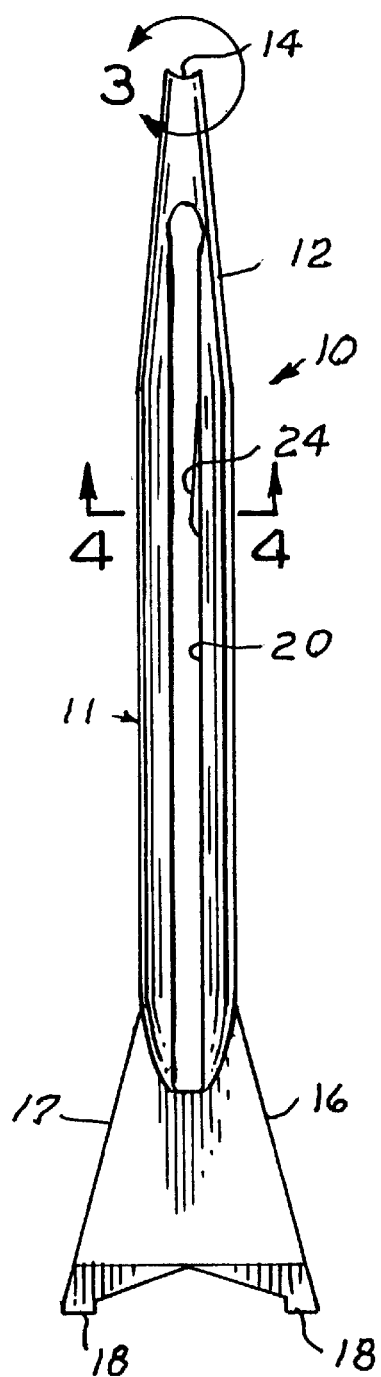
FIG. 1 is a top view of the tool.

The top surface of the body 11, as viewed in FIG. 1, is provided with an elongated slot 20 formed which terminates at respective ends in spaced relation with respect to the respective end portion of the tool. The width of the slot is sufficient to receive an intermediate portion of a mouse cable 22 connecting a mouse with a computer to store the device 10 adjacent a computer. As illustrated by FIG. 4, a protrusion 24 projects inwardly from one wall of the slot 20 to maintain the mouse cable 22 within the slot 20.

Obviously the invention is susceptible to changes or alterations without defeating its practicability. Therefore, I do not wish to be confined to the preferred embodiment shown in the drawings and described herein.

I claim:

1. An article of manufacture, comprising:

an elongated cylindrical body of selected diameter having converging end portions, one end portion terminating in a substantially rectangular configuration having a length substantially equal with one-third the rod diameter and a width relatively narrow when compared with its length and having a longitudinal concave recess formed on a radius substantially equal with one-half the rod diameter, the other end portion terminating in a transversely flat section having diverging side surfaces for precluding a lateral rolling action of the body on an inclined surface.

2. The article according to claim 1 in which the end of the flat section opposite said one end portion is bifurcated and forms a spanner wrench.

3. The article according to claim 2 in which the body is provided, intermediate its ends, with a longitudinal slot.

4. The article according to claim 3 in which a major portion of said body is cylindrical.

* * * * *